(12) United States Patent
Lezec et al.

(10) Patent No.: US 9,046,731 B2
(45) Date of Patent: Jun. 2, 2015

(54) PLASMONIC ENHANCEMENT OF MATERIAL PROPERTIES

(71) Applicant: National Institute of Standards and Technology, Gaithersburg, MD (US)

(72) Inventors: Henri J. Lezec, Bethesda, MD (US); Erich C. Walter, Silver Spring, MD (US); Amit Agrawal, Syracuse, NY (US); Albert Alec Talin, Gaithersburg, MD (US); Ting Xu, Gaithersburg, MD (US)

(73) Assignee: THE GOVERNMENT OF THE UNITED STATES OF AMERICA, AS REPRESENTED BY THE SECRETARY OF COMMERCE, THE NATIONAL INSTITUTE OF STANDARDS AND TECHNOLOGY, Washington, DC (US)

( * ) Notice: Subject to any disclaimer, the term of this patent is extended or adjusted under 35 U.S.C. 154(b) by 86 days.

(21) Appl. No.: 13/756,605

(22) Filed: Feb. 1, 2013

(65) Prior Publication Data

US 2013/0201544 A1    Aug. 8, 2013

Related U.S. Application Data

(60) Provisional application No. 61/594,417, filed on Feb. 3, 2012.

(51) Int. Cl.
*G02F 1/15* (2006.01)
*G09G 3/38* (2006.01)
(Continued)

(52) U.S. Cl.
CPC ............... *G02F 1/1533* (2013.01); *B82Y 20/00* (2013.01); *G09G 3/38* (2013.01); *G02F 1/15* (2013.01); *G02F 2001/1515* (2013.01); *G02F 2203/10* (2013.01)

(58) Field of Classification Search
CPC ............. F02F 1/00; G02F 1/15; G02F 1/153; G02F 1/1533; G02F 2001/00; G02F 2001/15; G02F 2001/1515; G02F 2001/167; G02F 2001/1676; G02F 2001/1678; G02F 2203/10; G09G 3/38
USPC .................................. 359/265–275; 345/105
See application file for complete search history.

(56) References Cited

U.S. PATENT DOCUMENTS 5,973,316 A   10/1999   Ebbesen et al.
6,040,936 A    3/2000   Kim et al.
(Continued)

FOREIGN PATENT DOCUMENTS

WO     0242836     5/2002

OTHER PUBLICATIONS

Compact, High-Speed and Power-Efficient Electroptic Plasmonic Modulators, Wenshan Cai, Justin S. White, and Mark L. Brongersma, Nano Letters, 2009, vol. 9, No. 12, 4403-4411.
(Continued)

*Primary Examiner* — Loha Ben
(74) *Attorney, Agent, or Firm* — Mark E. Bandy; Rankin, Hill & Clark LLP

(57) ABSTRACT

Various plasmonic structures in the form of electrochromic optical switches are described which exhibit relatively high optical switching contrast. The switches generally include a collection of nanoslits formed in a thin electrically conductive film. An electrochromic material is disposed on the conductive film and along the sidewalls of the nanoslit(s).

23 Claims, 12 Drawing Sheets

(51) Int. Cl.
*G02F 1/153* (2006.01)
*B82Y 20/00* (2011.01)

(56) References Cited

U.S. PATENT DOCUMENTS

| | | | |
|---|---|---|---|
| 6,712,999 | B2 | 3/2004 | Haering et al. |
| 7,256,925 | B2 * | 8/2007 | Noh et al. ............... 359/265 |
| 7,675,667 | B2 * | 3/2010 | Xu et al. ............... 359/265 |
| 7,884,994 | B2 | 2/2011 | Piroux |
| 7,944,597 | B2 | 5/2011 | RaginiDas et al. |
| 8,520,287 | B2 * | 8/2013 | Lee et al. ............... 359/273 |
| 2006/0108219 | A1 | 5/2006 | Kuroda et al. |
| 2011/0116168 | A1 | 5/2011 | Nikoobakht |
| 2012/0081703 | A1 | 4/2012 | Moskovits et al. |

OTHER PUBLICATIONS

Gap Plasmon Waveguide with a Stub: Structure for a wavelength Selective Device, Masanobu Haraguchi, Kazunori Iuchi, Hidenori Sokabe, Tatsuya Okuno, Toshihiro Okamoto, Masuo Fukui, Kazumasa Okamoto and Seiichi Tagawa, SPIE, vol. 7395, 2009, 6 pages.
Broadband Plasmonic Device Concentrating the Energy at the Nanoscale: The Crescent Shaped Cylinder, Alexandre Aubry, Dang Yuan Lei, Stefan A. Maier, and J.B. Pendry, Physical Review B 82, 125430, 2010, 9 pages.
Electrical Control of Plasmonic Nanodevices, Wenshan Cai, Mark L. Brongersma and Young Chul Jun, SPIE Newsroom, Jan. 9, 2012, 4 pages.
Plasmonic nanoresonators for high-resolution colour filtering and spectral imaging, Ting Xu, Yi-Kiei Wu, Xiangang Luo and L. Jay Guo, Nature Communications, May 17, 2010, 5 pages.
An Integrated Electrochromic Nanoplasmonic Optical Switch, Amit Agrawal, Ceren Susut, Gery Stafford, Ugo Bertocci, Benjamin McMorran, Henri J. Lezec, and A. Alec Talin, Nano Letters, 2011, 11, 2774-2778.
Surface Plasmons on Smooth and Rough Surfaces and on Gratings, Heinz Raether, Springer-Verlag, 1988, 73 pages.
Surface Plasmon Resonance Sensors for Detection of Chemical and Biological Species, Jiri Homola, Chem. Rev. 2008, 108, 462-493.
Actively Tuned Plasmons on Elastomerically Driven Au Nanoparticle Dimers, Fumin Huang and Jeremy J. Baumberg, Nano Lett, 2010, 10, 1787-1792.
Control of Optical transmission through metals perforated with subwavelength hole arrays, Tae Jin Kim and Tineke Thio, Optics Letters, vol. 24, No. 4, Feb. 15, 1999, 256-258.
Light Driven Plasmonic Switches Based on Au Nanodisk Arrays and Photoresponsive Liquid Crystals, Vincent K.S. Hsiao, Uye Bing Zheng, Bala Krishna Juluri, and Tony Jun Huang, Adv. Mater. 2008, 20, 3528-3532.
Electronically Controlled Surface Plasmon Dispersion and Optical Transmission Through Metallic Hole Arrays Using Liquid Crystal, Wayne Dickson, Gregory A. Wurtz, Paul R. Evans, Robert J. Pollard, and Anatoly V. Zayats, Nano Letters, 2008, vol. 8, No. 1, 281-286.
All-optical modulation by plasmonic excitationof CdSe quantum dots, Domenico Pacifici, Henri J. Lezec and Harry A. Atwater, Nature photonics, vol. 1, Jul. 2007, 402-406.
Electrooptic Modulation in Thin Film Barium Titanate Plasmonic Interferometers, Matthew J. Dicken, Luke A. Sweatlock, Domenico Pacifici, Henri J. Lezec, Kaushik Bhattacharya and Harry A. Atwater, Nano Letters 2008, vol. 8, No. 11, 4048-4052.
All Optical Switching in subwavelength metallic grating structure containing nonlinear optical materials, Chanjun Min, Pei Wang, Chunchong Chen, Yan Deng, Yonghua Lu, Hai Ming, Tingyin Ning, Yueliang Zhous and Guozhen Yang, Apr. 15, 2008, vol. 33, No. 8, Optics Letters, 869-871.

A Nonvolatile Plasmonic Switch Employing Photochromic Molecules, Ragip A. Pala, Ken T. Shimizu, Nicholas A. Melosh, and Mark L. Brongersma, Nano Letters 2008, vol. 8, No. 5, 1506-1510.
Ultrafast active plasmonics, Kevin F. MacDonald, Zsolt L. Samson, Mark I. Stockman, and Nikolay I. Zheludev, Nature Photonics, vol. 3, Jan. 2009, 55-58.
Designed Ultrafast optical nonlinearity in a plasmonic nanorod metamaterial enhanced by nonlocality, G.A. Wurtz, R. Pollard, W. Hendren, G.P. Wiederrecht, D.J. Gosztola, V.A. Podolskiy and A.V. Zayats, Nature Nanotechnology, vol. 6, Feb. 2011, 107-111.
Localized Surface Plasmon Resonance Spectroscopy and Sensing, Katherein A. Willets and Richard P. Van Duyne, Annu. Rev. Phys. Chem. 2007, 58, 267-297.
Giant Plasmon Resonance Shift Using Poly(3,4-ethylenedioxythiophene) Electrochemical Switching, V. Stockhausen, Pascal martin, Jalal Ghilane, Yann Leroux, Hyacinthe Randriamahazaka, Johan Greand, Nordin Felidj, and Jean Christophe Lacroix, J.Am. Chem. Soc. 2010, 132, 10224-10226.
Active Plasmonic Devices with Anisotropic Optical Response: A Step Toward Active Polarizer, Yann Leroux, Jean Christophe Lacroix, Claire Fave, Verena Stockhausen, Nordin Felidj, Johan Grand, Andreas Hohenau and Jaochim R. Krenn, Nano Letters 2009, vol. 9, No. 5, 2144-2148.
Elecrochemistry of Polynuclear Transition Metal Cyanides: Prussian Blue and Its Analogues, Kingo Itaya and Isamu Uchida, Acc. Chem. Res. 1986, 19, 162-168.
Electrochemical Deposition of Prussian Blue from a Single Ferricyanide Solution, Ru Yang, Zaibo Qian, and Jiaqi Deng, J. Electrochem Soc., vol. 145, No. 7, Jul. 1998, 2231-2236.
A Study of thin films of Prussian Blue on gold electrodes, using surface plasmon-polaritons, S. Cowen, J.R. Sambles and A. Glidle, J. Electroanal. Chem., 261 (1989) 455-462.
Impedance Analysis of Prussian Blue Films Deposited on Ito Electrodes, J.J. Garcia-Jareno, J.J. Navarro, A.F. Roig, H. Scholl and F. Vicente, Electrochimica Acta, vol. 40, No. 9, pp. 1113-1119, 1995.
Lite, Brite Displays, Jason Heikenfeld, IEEE Specrtum NA, Mar. 2010, 29-56.
Colours from electroactive polymers: Electrochromic, electroluminescent and laser devices based on organic materials, F. Carpi, D. De Rossi, Optics & Laser Technology 38, (2006) 292-305.
Millisecond switching in solid state electrochromic polymer devices fabricated from ionic self-assembled multilayers, Vaibhav Jain, Hank M. Yochum, Reza Montazami and James R. Heflin, Appl. Phys. Lett. 92, (2008), 4 pages.
Electrochemical and ellipsometric studies of polyaniline films grown under cycling conditions, Carlos M.G.S. Cruz, Edson A. Ticianelli, Journal of Electroanalytical Chemistry 428 (1997) 185-192.
Growth of Electropolymerized Polyaniline Thin Films, A. Guiseppi-Elie, S.R. Pradhan and A.M. Wilson, Chem. Mater. 1993, 5, 1474-1480.
Materials Screening and Applications of Plasmonic Crystals, Teri W. Odom, MRS Bulletin, vol. 35, Jan. 2010, 66-74.
Enhanced Contrast Ratios and Rapid Switching in Electrochromics Based on Poly(3,4-propylenedioxythiophene) Derivatives., Dean M. Welsh, Anil Kumar, E.W. Meijer, and John R. Reynolds, Adv. Mater. 1999, 11, No. 16, 1379-1382.
A MEMS light modulator based on diffractive nanohole gratings, Jack L. Skinner, A. Alec Talin, and David A. Horsely, Mar. 17, 2008, vol. 16, No. 6, Optics Express, 3701-3711.
Ultrathin Layers of Densely Packed Prussian Blue Nanoclusters Prepared from a Ferricyanide Solution, D. Zhang, K. Wang, D.C. Sun, X.H. Xia, and H.Y. Chen, Chem. Mater. 2003, 15, 4163-4165.
High Contrast Electrochromism for Layer by Layer Polymer Films, Dean M. DeLongchamp, Mark Kastantin and Paula T. Hammond, Chem. Mater. 2003, 15, 1575-1586.
Electrochromic materials and devices: Present and future, Prakash R. Somani, S. Radhakrishnan, Materials Chemistry and Physics 77 (2002) 117-133.

* cited by examiner

PLASMONIC ENHANCEMENT OF MATERIAL PROPERTIES

CROSS REFERENCES TO RELATED APPLICATIONS

This application claims priority from U.S. provisional application Ser. No. 61/594,417 filed on Feb. 3, 2012.

FIELD

The present subject matter relates to enhancement of optically active materials deposited in subwavelength slits and other geometries such as used in certain plasmonic structures. More specifically, the present subject matter relates to enhancing material properties of electrochemical plasmonic structures, and particularly those used in electrochromic applications. The present subject matter also relates to electrochromic devices using plasmonic structures.

BACKGROUND

The understanding and control of the interaction of light with matter is fundamental to science and technology. Such an understanding has led to the development of lasers and optical fibers which form the backbone of modern communication systems. In addition, significant advances in nanofabrication techniques over the last few years have made it possible to fabricate sophisticated optical devices with greater functionality at subwavelength dimensions. However, active control of light propagation at subwavelength scales still remains a challenge.

During the last decade there has been tremendous interest in using optical devices based on surface plasmon polaritons (SPPs) for subwavelength control of light. SPPs are collective charge oscillations coupled to an external electromagnetic field that propagate along an interface between a metal and a dielectric. It is the mixed nature of SPPs and their dependence on the index of refraction of the dielectric medium facing the metal which forms the basis for their application in chemical and biological sensing, a technique broadly known as surface plasmon resonance (SPR) spectroscopy. In addition, active control of SPPs has previously been demonstrated by purely mechanical means, electro-mechanical transduction or by manipulating the dielectric refractive index either optically or electrically using liquid crystals, quantum dots, nonlinear optical materials or photochromic dyes. The weak nonlinearity of the metal itself has also been utilized in planar or nanostructured geometries for ultrafast active plasmonic applications. However, the various approaches explored to date to modulate light transmission using SPPs either require large pump fluences (several $mJ/cm^2$), relatively high switching voltages (>10 V), multiple control wavelengths, or achieve only modest values (<70%) of optical switching contrast (defined herein as the change in transmitted optical intensity modulated between its highest and lowest values, normalized to its highest value).

In addition to devices exploiting propagating SPPs, there has also been strong interest in recent years in applications based on stationary charge-oscillation resonances in metallic nanostructures known as localized surface plasmons (LSP). For example, active tuning of LSP resonances has been demonstrated in the case of Au nanoparticles imbedded in a conducting polymer matrix, by electrochemically changing the electronic state of the polymer. Compared to nanoparticle-based devices sustaining stationary LSP resonances, however, metallic cavity waveguide devices sustaining propagating SPPs readily offer the advantages of both deep-subwavelength mode confinement and increased interaction length with active materials.

Although satisfactory in many regards, a need remains for a new strategy by which characteristics of plasmonic structures can be enhanced. And, in particular, a need exists for improved plasmonic structures as utilized in electrochemical applications and devices.

SUMMARY

The difficulties and drawbacks associated with previously known technologies are addressed in the present subject matter relating to plasmonic structures, electrochromic devices using such structures, and methods for improving the performance of plasmonic structures.

In one aspect, the present subject matter provides a plasmonic structure comprising a substrate, and an electrically conductive film disposed on the substrate. The film defines an outer face, and at least one nanoslit extending through at least a portion of the thickness of the film. The nanoslit defines opposing sidewalls. The plasmonic structure also comprises an effective amount of an electrochromic material disposed on the sidewalls of the nanoslit.

In another aspect, the present subject matter provides an electrochromic device comprising a fluid medium in the form of an electrolyte. The device also comprises a plurality of plasmonic structures. Each plasmonic structure includes (i) a substrate, (ii) an electrically conductive film disposed on the substrate, the film defining an outer face and at least one nanoslit extending through at least a portion of the thickness of the film, the nanoslit defining opposing sidewalls, and (iii) an effective amount of an electrochromic material disposed on the sidewalls of the nanoslit. Each of the plurality of plasmonic structures are exposed to, and in contact with, the fluid medium along the outer face and within the nanoslit of the switch.

In yet another aspect, the present subject matter provides a plasmonic electrochromic optical switch comprising a substrate and a layer of an electrically conductive material disposed on the substrate. The layer of electrically conductive material defines a top face. The layer of electrically conductive material is selected from the group consisting of gold, silver, aluminum, indium tin oxide, and combinations thereof. The switch also comprises at least one nanoslit defined in the layer of electrically conductive material. The nanoslit extends through at least a portion of the thickness of the electrically conductive material. The nanoslit defines opposing sidewalls. The switch also comprises a layer of an electrochromic polymer disposed on the top face of the electrically conductive material and on the nanoslit sidewalls. And, the switch additionally comprises an electrolyte in contact with the layer of the electrochromic polymer and disposed between the opposing sidewalls of the nanoslit.

In still another aspect, the present subject matter provides a method of improving performance of a plasmonic device utilizing an electrically conductive film disposed on a substrate. The method comprises forming at least one nanoslit in the electrically conductive film. The nanoslit defines opposing sidewalls. And, the method also comprises depositing an effective amount of an electrochromic material on the sidewalls of the nanoslit.

As will be realized, the subject matter described herein is capable of other and different embodiments and its several details are capable of modifications in various respects, all

DETAILED DESCRIPTION OF THE EMBODIMENTS

Figure 1A:
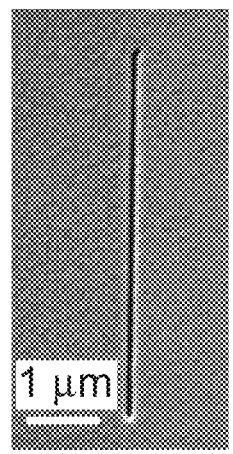
FIG. 1A is an SEM image of a nanoslit in accordance with the present subject matter fabricated in a 250 nm thick Au film on fused silica using focused ion beam (FIB) milling.

The present subject matter involves enhancement of optically active materials deposited in a subwavelength nanoplasmonic slit. The basis for improvement stems from the orthogonalization of the light path from the current and ionic diffusion paths. This allows the light coupled to plasmons, Surface Plasmon Polaritons (SPPs), to travel through more material while maintaining the physical properties of a thinner film. The increased spatial overlap of the SPP and the dielectric material as well as the increased propagation length of the SPP through the slit improve performance. The SPP properties can be tuned by varying the plasmonic structure or the dielectric deposited on the plasmonic material.

Generally, the present subject matter provides a plasmonic structure which can be utilized in a wide range of applications, systems, and methods. The plasmonic structure comprises a substrate and an electrically conductive film disposed on the substrate. The film has one or more nanoslits extending through the film. As described in greater detail, herein, the nanoslits can extend partially through the thickness or entirely through the thickness of the film. The nanoslit(s) define opposing sidewalls. The plasmonic structure also comprises an effective amount of an electrochromic material disposed in the nanoslit, and particularly on the sidewalls of the nanoslit.

The substrate used in the plasmonic structure can be formed from a wide array of materials such as but not limited to fused silica, fused quartz, and glass. It is also contemplated that the substrate can include other materials such as but not limited to silicon oxide, silicon, gallium arsenide, aluminum oxide, metal oxide, or other suitable material(s). For many optical applications, it is preferred that the substrate be formed from silica, quartz, and/or glass.

The electrically conductive material in the plasmonic structure serves as the plasmonic material and thus can be formed from any suitable material for the intended device or application of the plasmonic structure. Typically, suitable materials for the electrically conductive material include but are not limited to gold, silver, aluminum, indium tin oxide (ITO), other conductive metals and alloys, certain electrically conductive polymers, and combinations thereof. Typically, the electrically conductive material is gold.

The thickness of the electrically conductive film is typically from about 50 nm to about 500 nm. For many applications, a thickness of 250 nm is preferred. However, it will be appreciated that the present subject matter includes the use of a wide range of thicknesses for this film in the subject plasmonic structures, such as thicknesses less than 50 nm and greater than 500 nm.

The particular configuration and dimensions of the nanoslit(s) used in the plasmonic structures depend upon the intended application and operating characteristics desired. However, for many applications, a nanoslit width, i.e dimension between opposing sidewalls of the nanoslit, is from about 10 nm to about 100 nm, with a preferred width of 50 nm. It will be understood that the present subject matter includes widths greater than 100 nm, and less than 10 nm. Moreover, it will also be understood that the nanoslits may be in a wide array of forms besides a linear form as shown and described in greater detail herein in conjunction with FIG. 1A.

Nearly any electrochromic material suitable for the intended application can be utilized in the plasmonic structures of the present subject matter. Generally, electrochromic materials exhibit a reversible change in absorbance, reflection or transmission of electromagnetic radiation (e.g., any one or more of ultraviolet, visible, infrared, microwave, etc.). This change in absorbance can be induced by an electrochemical oxidation-reduction reaction. A preferred electrochromic material is Prussian Blue, and is described in greater detail herein. However, the present subject matter includes a wide range of other electrochromic materials such as, but not limited to, oxides of the transitional metals such as tungsten, niobium, vanadium, titanium, tantalum, nickel, and others, as well as polyaniline, polythiophene, and others. In certain applications, particular electrochromic polymers can be used. An example of an electrochromic polymer is the previously noted polyaniline. Another example of an electochromic polymer which can be used in certain versions of the present subject matter is poly(2,2-dimethyl-3,4 propylenedioxythiophene) (Poly(ProDOT-Me$_2$)). Additional examples of electrochromic materials include, but are not limited to transition metal oxides (e.g., tungsten oxide), viologens (1,1'-disubstituted-4,4'-bipyridinium salts), inorganic transition metal complexes (e.g., iron(III) hexacyanoferrate(II)) and conjugated conducting polymers (e.g., polythiophenes, polyalkylenedioxythiophenes, polypyrroles, polyalkylenedioxypyrroles, polycarbazoles and polyanilines). Additional examples of electrochromic materials may include inorganic compounds such as previously noted tungsten oxides, molybdenum oxides, and the like, and organic compounds such as pyridine, aminoquinone, azine compounds, and the like.

The plasmonic structure of the present subject matter preferably includes a layer or one or more regions of the electrochromic materials. As described in greater detail herein, the layer or region(s) of electrochromic materials typically has a thickness of from about 1 nm to about 100 nm, more particularly from about 5 nm to about 50 nm, with from about 15 nm to 20 nm and 20 nm being preferred for the nanoslit configurations described herein. It will be appreciated that a wide array of thicknesses can be utilized depending upon the plasmonic structure and configuration of the nanoslit(s).

The amount of electrochromic material deposited in a nanoslit in the plasmonic structure can be quantified by reference to a fill fraction. The term "fill fraction" as used herein refers to the proportion of the volume of the nanoslit filled or occupied by the electrochromic material. As described in greater detail herein, depending upon the electrochromic material and the manner of its deposition in the nanoslits, the material is typically in the form of nanoparticles. And, for many electrochromic materials when deposited in solid form, the materials are in a crystalline state, and hence are periodically referred to herein as nanocrystals. Generally, the fill fraction of the plasmonic structures is within a range of from about 10% to about 30%, with 25% being preferred for many applications. However, it will be appreciated that the present subject matter includes the use of fill fractions less than 10% and greater than 30%.

The present subject matter also provides an electrochromic device that has higher contrast and faster switching speeds than an equivalent conventional thin film device. An electrochromic material is deposited into subwavelength slits which are formed in an electrode layer which orthogonalizes the light path to the current and ionic diffusion paths. This electrode geometry utilizes the transmission of light by surface plasmon polaritons through subwavelength slits to improve the performance of the electrochromic material. The diffusion of ions through thicker films of electrochromic material required to obtain reasonable optical contrast slows down the switching speed of the devices considerably. The "clear" or transparent state of the electrochromic material also has a thickness dependent absorbance. Switching speed is very important for many applications in the display field, especially ones that require video rate capabilities. Using the electrode configuration in accordance with the present subject matter will significantly improve both of these critical factors. Combined with the electrochromic material, one can prepare an electrode that will modulate different colors with the same electrochromic transition. This would allow for the construction of a one layer RBG display as compared to three separate layers, that can use the same driving voltages instead of three separate voltages for three separate electrochromic colors.

Electrochromic devices in accordance with the present subject matter generally comprise a plurality of the previously described plasmonic structures which are exposed to and in contact with, e.g. by immersion, in a suitable fluid medium such as an electrolyte. The electrolyte can be any appropriate electrolyte used in electrochromic applications as known in the art.

Additional details regarding electrochromic devices, their fabrication, and operation are provided in U.S. Pat. Nos. 6,712,999; 7,884,994; and 7,944,597.

A sub-wavelength patterned electrode in accordance with the present subject matter enables an electrochromic material to have faster switching speeds and contrast compared to an unpatterned electroactive material. It is also possible to tune the electrochromic device's color independent of the electrochromic material used.

The present subject matter also provides methods of improving the performance of a plasmonic device or structure by incorporating effective amount(s) of one or more electrochromic materials within the plasmonic device or structure. For the plasmonic structures described herein, incorporation of the electrochromic material is performed by depositing the material along opposing sidewalls of the nanoslit in the plasmonic structure.

In accordance with the present subject matter, an electrochemically driven optical switch based on absorption modulation of an SPP mode propagating in a metallic nanoslit waveguide containing nanocrystals of potassium iron hexacyanoferrate dye, an electrochromic material commonly known as Prussian Blue, is provided. The waveguide includes a rectangular slit aperture of deep-subwavelength width in an optically opaque Au film having a coating of the dye nanocrystals on the walls of the slit. The dye nanocrystals are preferentially grown or otherwise deposited on the slit sidewalls using cyclic voltammetry deposition. Optical transmission modulation with a switching contrast as high as approximately 96% in the red ($\lambda_0$=633 nm) is achieved by electrochemically switching the dye between an optically-absorbing oxidized "Prussian Blue" (PB) state consisting of potassium iron(III) hexacyanoferrate(II) (KFe$_2$(CN)$_6$), and an optically transparent reduced "Prussian White" (PW) state consisting of potassium iron(II) hexacyanoferrate(II) (K$_2$Fe$_2$(CN)$_6$).

High switching efficiency is enabled by the strong spatial overlap between SPP and dye nanocrystals induced by the deep-subwavelength-scale lateral confinement of the optical mode in the slit, as well as from an anomalously large absorption coefficient obtained for the PB state of Prussian Blue nanocrystals grown on Au (compared to published values for bulk Prussian Blue). Finally, the relatively small change in electrochemical potential required to convert the dye nanocrystals from the PW state to the PB state ($\Delta V$ is approximately -0.8 V) yields a practical electro-optical switching device with control voltages not exceeding 1 V in magnitude.

Figure 9A:
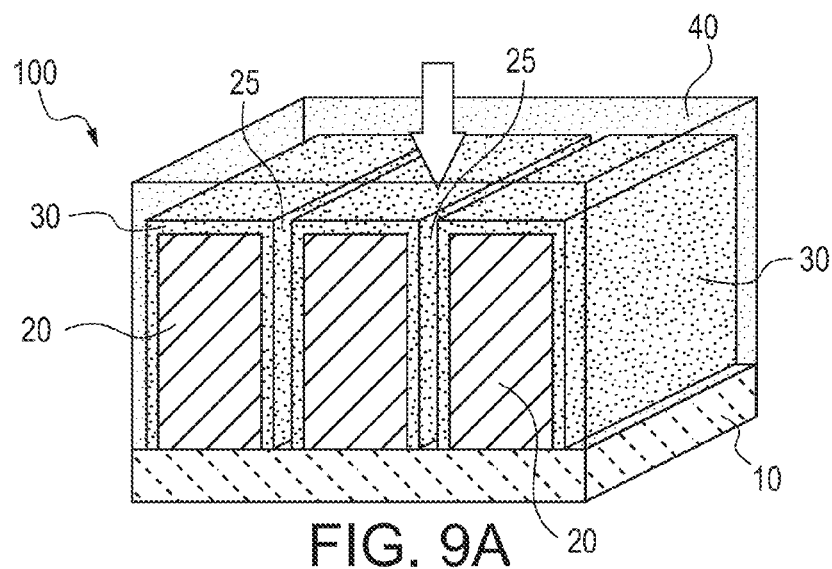
FIG. 9A is a schematic diagram of a plasmonic electrochromic optical switch incorporating Au ("Au-PECOS") in accordance with the present subject matter.
Figure 11:
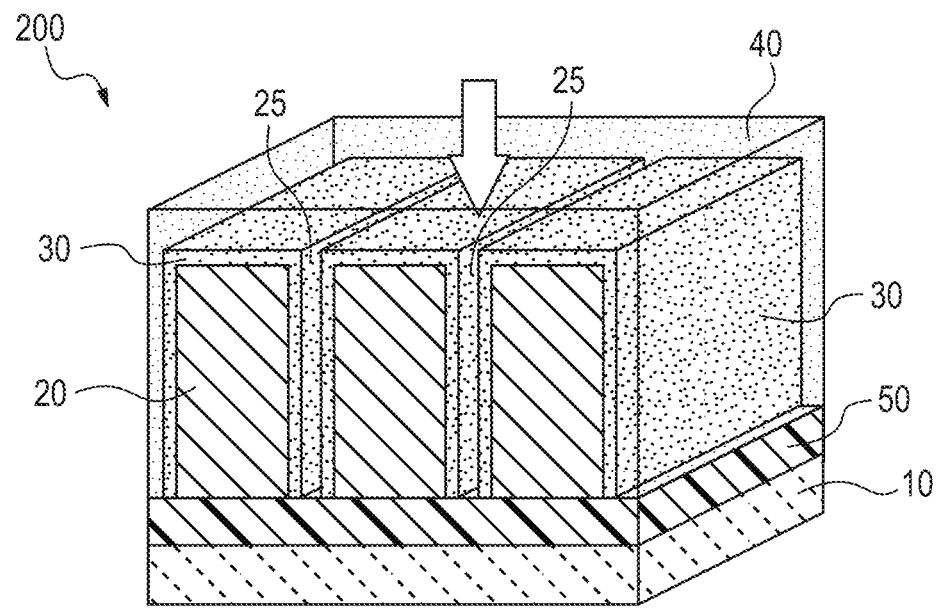
FIG. 11 is a schematic diagram of a plasmonic electrochromic optical switch incorporating Al ("Al-PECOS") in accordance with the present subject matter.

FIGS. 9A and 11 schematically depict embodiments of plasmonic electrochromic optical switches in accordance with the present subject matter. Specifically, FIG. 9A illustrates a plasmonic assembly 100 comprising a substrate 10, and one or more spaced apart regions 20 of an electrically conductive material. The regions 20 are separated by nanoslit(s) 25 as described herein. The spaced apart regions 20 can for example be formed by depositing a layer of the electrically conductive material and then forming the nanoslit(s) through the thickness of the layer. The plasmonic assembly 100 of FIG. 9A also comprises a layer 30 of an electrochromic material and in certain versions of the subject matter, an electrochromic polymer, disposed on the layer of the electrically conductive material. More particularly, the layer 30 of electrochromic material is disposed on opposing sidewalls of the nanoslits 25. The plasmonic assembly 100 also comprises an electrolyte 40 generally in contact with the layer 30 of the electrochromic material and also disposed in the nanoslits 25. FIG. 11 schematically illustrates another plasmonic assembly 200 generally paralleling the previously described assembly 100 of FIG. 9A, but including an optional waveguide layer 50 disposed between the substrate 10 and the electrically conductive material 20.

Examples

Figure 1B:
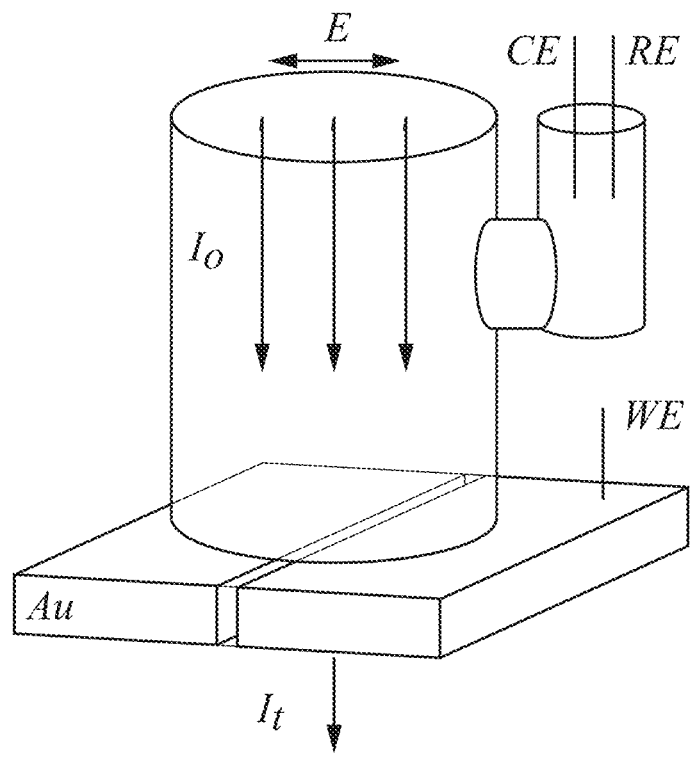
FIG. 1B is a schematic of an electrochemical cell integrated with a nanoplasmonic device for transmission measurements used in evaluating the present subject matter.

Experimental devices were fabricated on fused silica substrates coated with a 2 nm thick Ti adhesion layer. A nanoslit-patterned sample (Sample A) in accordance with the present subject matter, was formed by evaporation of an optically thick Au film of thickness 250 nm on one of the fused silica substrates. Rectangular slits of width 50 nm and length 5 μm were then milled through the Au film using a focused ion beam (FIB). A scanning electron microscope (SEM) image of one of the nanoslits of Sample A is shown in FIG. 1A. In addition, a semi-transparent unpatterned reference sample (Sample B) was formed by evaporating a Au film of thickness 30 nm on another fused silica substrate. Samples A and B were then used as working electrodes in a spectro-electrochemical cell ('WE' in FIG. 1B). An O-ring of diameter 15 mm, clamped between the substrate and the body of the cell to form a water-tight seal, defined the geometric area of the working electrode. Prussian Blue deposition on Samples A and B was carried out in an electrolyte solution containing 5 mM K$_4$Fe(CN)$_6$ in 0.1 M HClO$_4$, using a saturated sulfate reference electrode (SSE) ('RE' in FIG. 1B) separated by a Luggin capillary, and a coiled Pt wire counter electrode ('CE' in FIG. 1B). A microscope connected to a spectrometer/Si CCD camera was used to measure the optical transmission of Samples A and B under normal incidence illumination at $\lambda_0$=633 nm. In the case of Sample A, the incident light was polarized with electric field orthogonal to the slit length. The optical transmission and the working electrode current were recorded simultaneously during the ferrocyanide/ferricyanide redox reaction as the potential was cycled at a rate of 10 mV/s between -0.8 V to 0.7 V (SSE). RE, CE, and WE correspond to the reference electrode, counter electrode, and working electrode respectively.

Figure 2A:
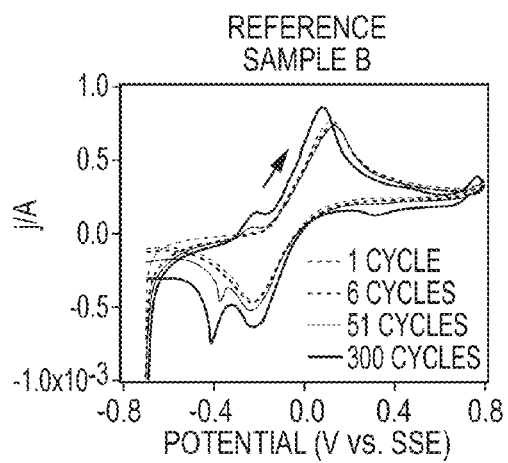
FIGS. 2A-2D are a series of four cyclic voltammograms of $K_4Fe(CN)_6$ in 0.1 M $HClO_4$ solution collected with (a) 30 nm thick unpatterned reference gold electrode (reference Sample B) and (b) nanoslit patterned 250 nm thick gold electrode (Sample A in accordance with the present subject matter).
Figure 2B:
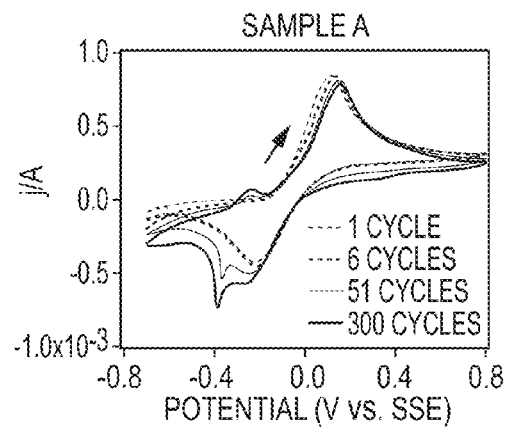
Figure 2C:
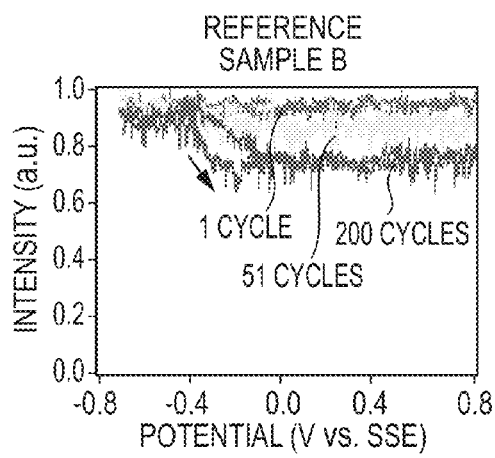
Figure 2D:
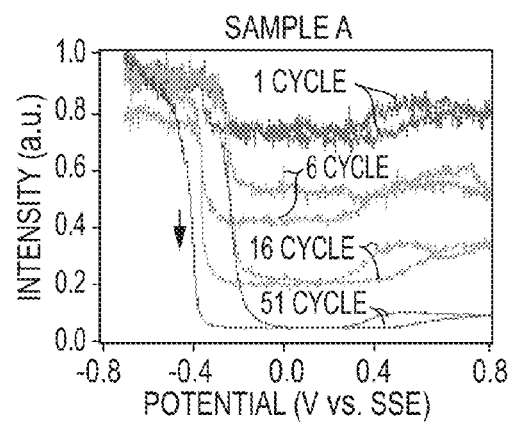

A series of cyclic voltammograms (CVs) were performed using the semi-transparent reference Sample B facing a solution of K$_4$Fe(CN)$_6$ in 0.1 M HClO$_4$ (FIG. 2A) while simultaneously monitoring the optical transmission (FIG. 2C). The first CV is typical of a ferricyanide/ferrocyanide redox couple. However, on the sixth cycle, a small peak emerges at approximately -0.4 V (SSE) on the cathodic sweep. After 300 cycles, additional peaks located at approximately -0.4 V (SSE) and approximately 0.35 V (SSE) are clearly visible. The location of these peaks is consistent with the published redox behavior of Prussian Blue. Additional peaks at approximately 0.4 V (SSE) and approximately 0.35 V (SSE) at higher number of cycles consistent with the redox behavior of Prussian Blue are clearly evident. A corresponding similar evaluation was performed using the Sample A in accordance with the present subject matter is shown in FIG. 2B, and addressed in greater detail. Corresponding normalized optical transmission through Sample B (FIG. 2C) and Sample A (FIG. 2D) are shown. The arrows in FIGS. 2A-2D indicate the direction of the potential sweep during the anodic cycle.

The characteristic deep blue color of the dye in the PB state is due to charge transfer from the carbon surrounded Fe(II) to the nitrogen-surrounded Fe(III). Reduction of the dye in the PB state is accomplished by diffusion of electrons (from Au) and K$^+$ ions (from solution) into the film, leading to conversion into K$_2$Fe$_2$(CN)$_6$, commonly known as Prussian White or Everitt's salt, while oxidation of the dye in the PB state is accomplished by out-diffusion of electrons and ions, leading to conversion into Fe$_2$(CN)$_6$, commonly known as Berlin Green. Deposition of Prussian Blue by CV on Au or Pt working electrodes from a weakly acidic ferricyanide (K$_3$Fe(CN)$_6$) solution has previously been reported along with a general description of the deposition mechanism. The ferricyanide dissociates into free ferric ions according to the following reaction (I):

so that a mixture of ferric and ferricyanide is present in solution. Dissociation is strongly pH dependent which partially explains why Prussian Blue deposition is favored in acidic solutions. On the first cathodic cycle, both the ferric and ferricyanide are reduced to ferrous and ferrocyanide. Ferrocyanide ion reacts with ferrous ion in the presence of K$^+$ to form material in the PW state on the working electrode surface. The PW state is then converted to the PB state upon oxidation. The extremely low ferric ion concentration leads to a dense and crystalline layer of deposited material. The deposition rate can be quantified by integrating the PB/PW reduction current, assuming the following electrochemical reaction (II):

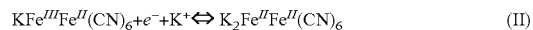

Figure 4:
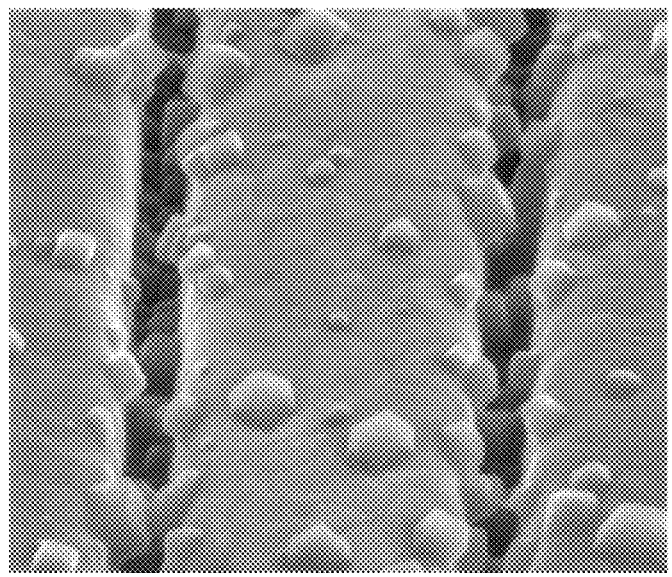
FIG. 4 is a scanning electron microscope (SEM) image of a sample of a sputtered Au film on a glass substrate, incorporating two FIB milled slits of a width of approximately 50 nm in accordance with the present subject matter.

The data in FIGS. 2A and 2B was examined and the present inventors determined that on average each cycle generates about $4 \times 10^{-11}$ mol/cm$^2$ of KFeFe(CN)$_6$, which corresponds to approximately 0.1 monolayers. Based on this growth rate, 200 cycles would produce a film of thickness approximately 20 nm, assuming uniform deposition. Note that the CVs collected for Sample B (FIG. 2A) and Sample A (FIG. 2B) are nearly identical, indicating that deposition of Prussian Blue progressed in a similar manner for the two Au substrates. Specifically, referring to FIG. 4, a secondary electron microscope (SEM) image is shown of a sample consisting of a sputtered Au film on a glass substrate (Au thickness of 250 nm), incorporating two focused ion beam milled slits of width approximately 50 nm each. The individual slit dimensions are identical to those used in the optical switching evaluations described in conjunction with FIGS. 2B, 2D, and 2F. The image was acquired after 51 cycles of deposition of Prussian Blue onto the sample surface. Preferential deposition of Prussian Blue nanocrystals on the side walls of the slits is apparent, with a slit fill fraction of approximately 25%.

Figure 2E:
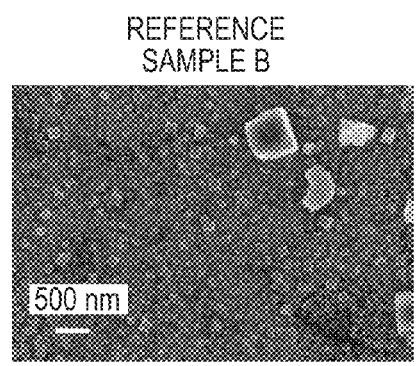
FIGS. 2E-2F are SEM images of the reference sample B after 300 cycles and Sample A of the present subject matter after 51 cycles, respectively.
Figure 2F:
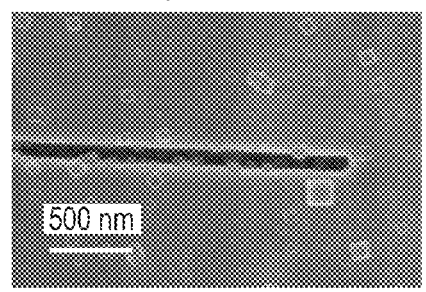
Figure 5:
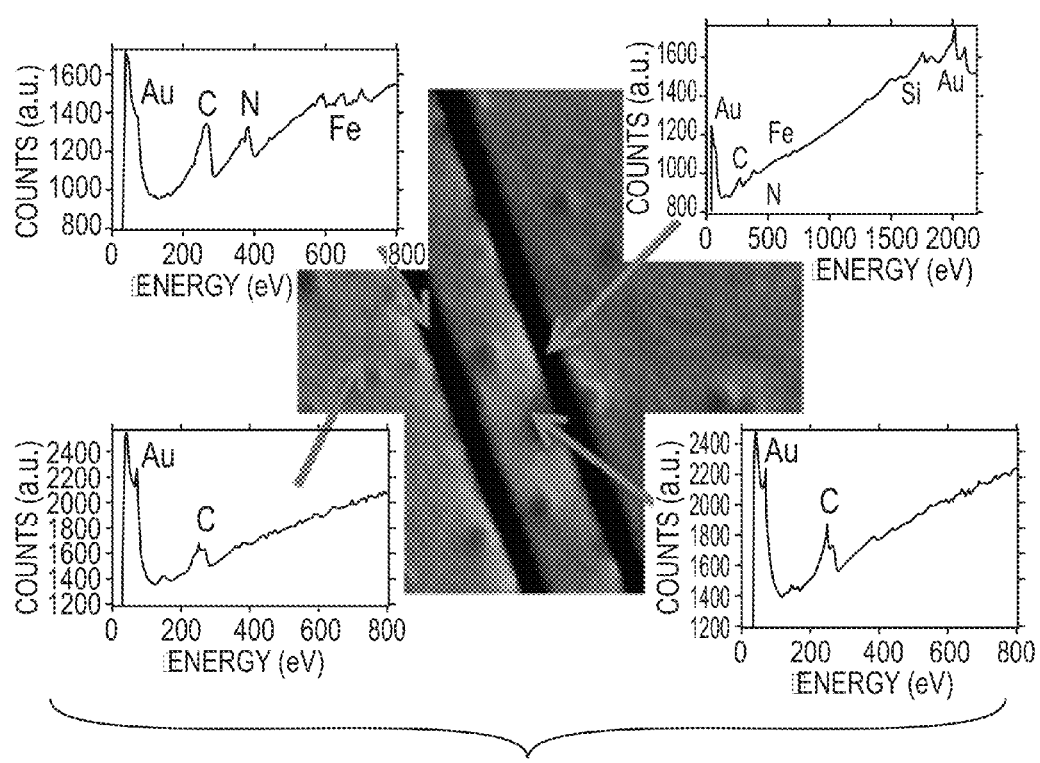
FIG. 5 is an Auger electron microscope image of a sample of a sputtered Au film on a glass substrate, incorporating two FIB milled slits of width of approximately 50 nm in accordance with the present subject matter.

During the anodic sweep, the transmitted optical intensity measured through both semi-transparent reference Sample B (FIG. 2C) and nanoslit-patterned Sample A (FIG. 2D) is observed to drop from a more transmissive state below −0.4 V to a more absorbing state between 0 V to 0.2 V, consistent with switching of the dye from PW state to PB state. Measurement of optical intensity can be characterized by optical switching contrast. Optical switching contrast as referred to herein is based upon transmitted light intensity at transmissive and absorbing states $I_{ON}$ and $I_{OFF}$. $I_{ON}$ and $I_{OFF}$ are defined herein as the transmitted light intensity at voltages of −0.7 V and at 0 V, which are representative of the transmissive and absorbing states, respectively, yielding an optical switching contrast defined as $\gamma = (I_{ON} - I_{OFF})/I_{ON}$. For both Samples A and B, $\gamma$ increases as a function of the number of cycles, reaching a maximum asymptotic value of approximately 30% after 200 cycles for Sample B and approximately 96% after only 51 cycles for Sample A. In the case of Sample A, optical switching between approximately −0.4 V (SSE) and approximately 0.35 V (SSE), consistent with the Prussian Blue redox transitions, is evident as early as during the first cycle (FIG. 2D), with an initial switching contrast $\gamma$ of approximately 30%. In comparison, the planar device configuration of Sample B requires approximately 50 cycles for a clear modulation in optical transmission to emerge. Normal incidence SEM images of reference Sample B after 300 cycles of deposition and nanoslit-patterned Sample A after 51 cycles are shown in FIGS. 2E and 2F, respectively. Reference Sample B appears nearly completely covered with cubic crystallites ranging in width from a few to over one hundred nanometers. In the case of Sample A, the crystallites are observed to deposit preferentially on the nanoslit sidewalls. Preferential deposition in the nanoslit was further confirmed by high resolution SEM imaging down the length of the slit using a sample tilt of 52° (as shown and described in FIG. 4), as well as by scanning Auger electron spectroscopy (FIG. 5) collected following several cycles of deposition. The Auger electron microscope image (FIG. 5) shows a sample consisting of a sputtered Au film on a glass substrate (Au thickness of 250 nm), incorporating two focused ion beam milled slits of width approximately 50 nm. The individual slit dimensions are identical to those used in the optical switching evaluations previously described. Auger electron spectra (insets in FIG. 5) are acquired after 5 cycles of deposition of Prussian Blue onto the sample surface. Elemental maps indicate preferential deposition of Prussian Blue inside the nanoslits, as evidenced by detection of Fe and N only in those regions.

Figure 3:
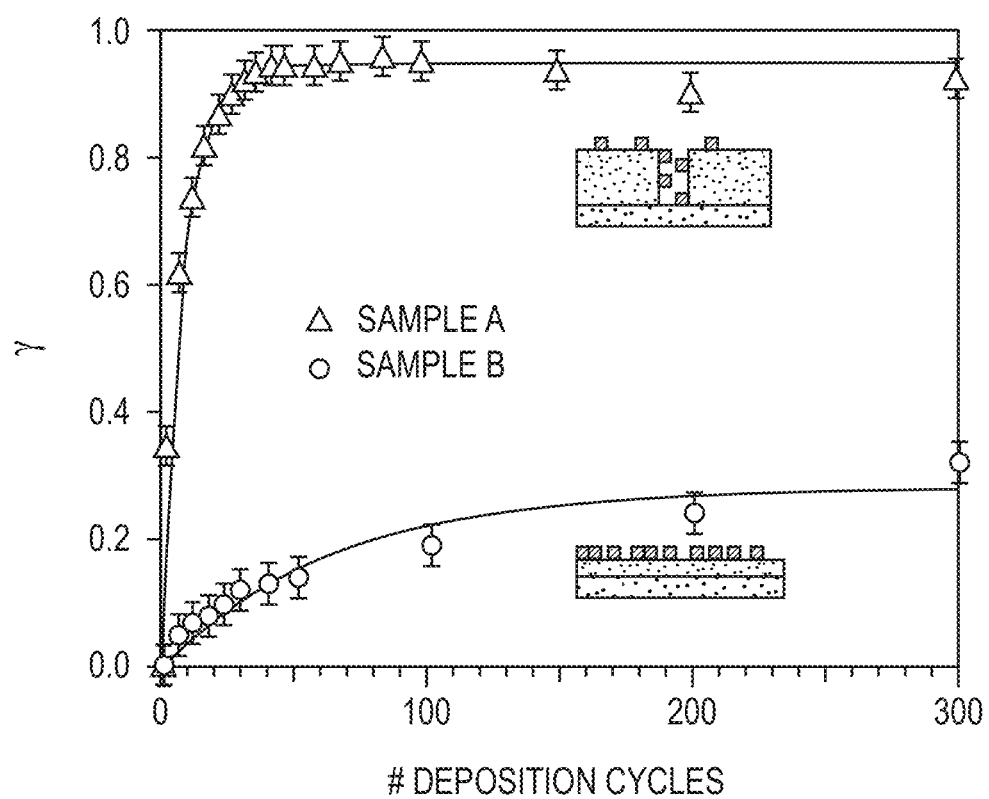
FIG. 3 is a graph showing switching contrast γ as a function of number of cycles extracted from the transmission measurements of samples A and B in FIGS. 2A-2D.
Figure 6:
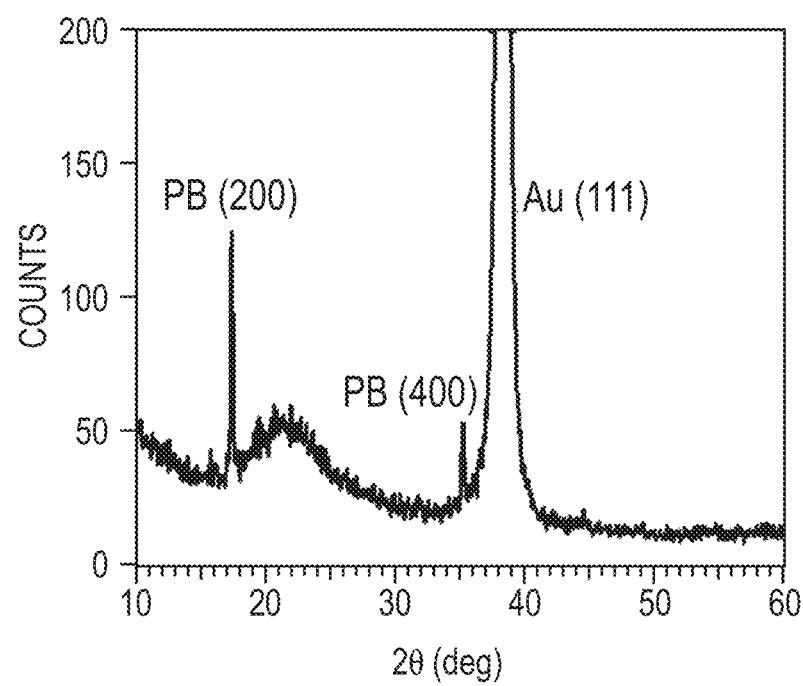
FIG. 6 is an x-ray diffraction pattern of a sample of a 50 nm thick Au film on glass after 300 cycles of Prussian Blue deposition.

X-ray diffraction patterns collected on both Samples A and B confirmed that the cubic nanoparticles were (100)-oriented crystallites of Prussian Blue. FIG. 6 illustrates an X-ray diffraction pattern of a sample consisting of a 50 nm thick Au film on glass (semi-transparent reference Sample B) after 300 cycles of Prussian Blue deposition. The diffraction pattern is collected using a powder diffractometer and Cu K-alpha X-rays (0.154 nm). On the basis of SEM images acquired after a wide range of number of deposition cycles it is estimated that the fill fraction of crystallites in the nanoslits of Sample A reaches a maximum value of approximately 0.25 after approximately 50 deposition cycles, with an average crystallite width of approximately 20 nm. This observed saturation in nanoslit fill fraction explains why switching contrast $\gamma$ does not significantly increase beyond approximately 96% with further deposition beyond 50 cycles. The optical switching contrast performance of Samples A and B as a function of number of deposition cycles is summarized in FIG. 3. Significantly higher switching contrast is evident in the case of the nanocrystal decorated slit geometry (Sample A). The error bars represent the standard deviation of the variation in recorded intensity resulting from the noise of silicon CCD detector.

To understand the origin of the large magnitude observed for the optical switching contrast of nanoslit sample A, two dimensional finite difference time domain (FDTD) simulations were used to replicate light transmission through a nanoslit containing dye nanocrystals switched between PW and PB states. The simulated structure consisted of a 50 nm wide slit in a 250 nm thick Au film on glass immersed in a medium of index of refraction 1.33 (replicating the aqueous environment of a typical electrochemical cell). Dye nanocrystals were modeled as 20 nm×20 nm squares evenly distributed on the slit sidewalls, with a slit fill fraction of approximately 25%. The indices of refraction initially used to model PW and PB states, respectively $n_{PW} = 1.371$ and $n_{PB} = 1.371 + i\,0.186$, were obtained from literature values for Prussian Blue in bulk form. Illumination consisted of a continuous frequency linearly polarized electromagnetic wave of wavelength $\lambda_0 = 633$ nm, with electric field polarized orthogonal to the width of the slit. Simulations reveal that the presence of SPP modes in the slit with intensity maxima concentrated on the slit sidewalls. Simulated transmitted light intensities under transparent PW and absorbing PB nanocrystal states, respectively $I_{PW}$ and $I_{PB}$, yield a theoretical switching contrast $\gamma_{FDTD} = (I_{PW} - I_{PB})/I_{PW} = 33.8\%$, which is significantly smaller than the measured switching contrast shown in FIG. 3. The measured switching contrast $\gamma$ of approximately 96% could be matched in simulation by setting $n_{PB} = 1.371 + i\,1.5$, in other words assuming an eight-fold increase in the imaginary part of the index of refraction.

Figure 7:
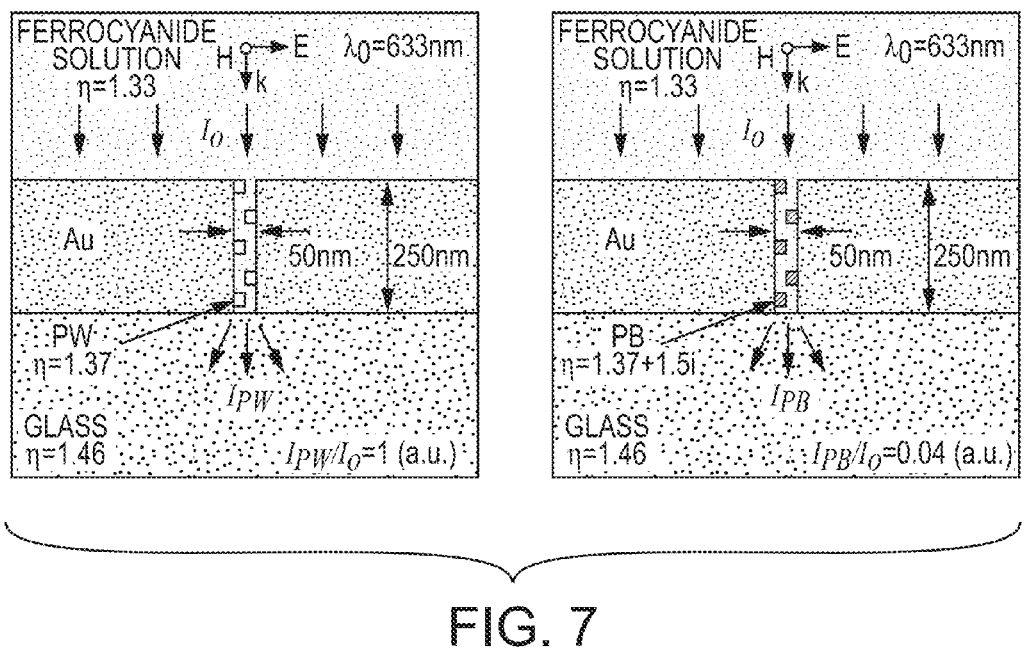
FIG. 7 illustrates sample and illumination geometries used for two dimensional finite difference time domain (FDTD) simulations of transmission through a nanoslit filled with Prussian Blue nanocrystals during switching in accordance with the present subject matter.

Specifically, FIG. 7 shows sample and illumination geometry used for two-dimensional finite difference time domain (FDTD) simulations of transmission through a nanoslit filled with Prussian Blue nanocrystals, as they are switched between PB and PW states. $I_0$ and $I_{PW(PB)}$ represent, respectively, the light intensity of the incident plane wave and the transmitted light intensity into the far field on the exit side of the device. E, H, k represent electric field polarization, magnetic field polarization and propagation wave vector of the incident plane wave ($\lambda_0 = 633$ nm), respectively.

Figure 8:
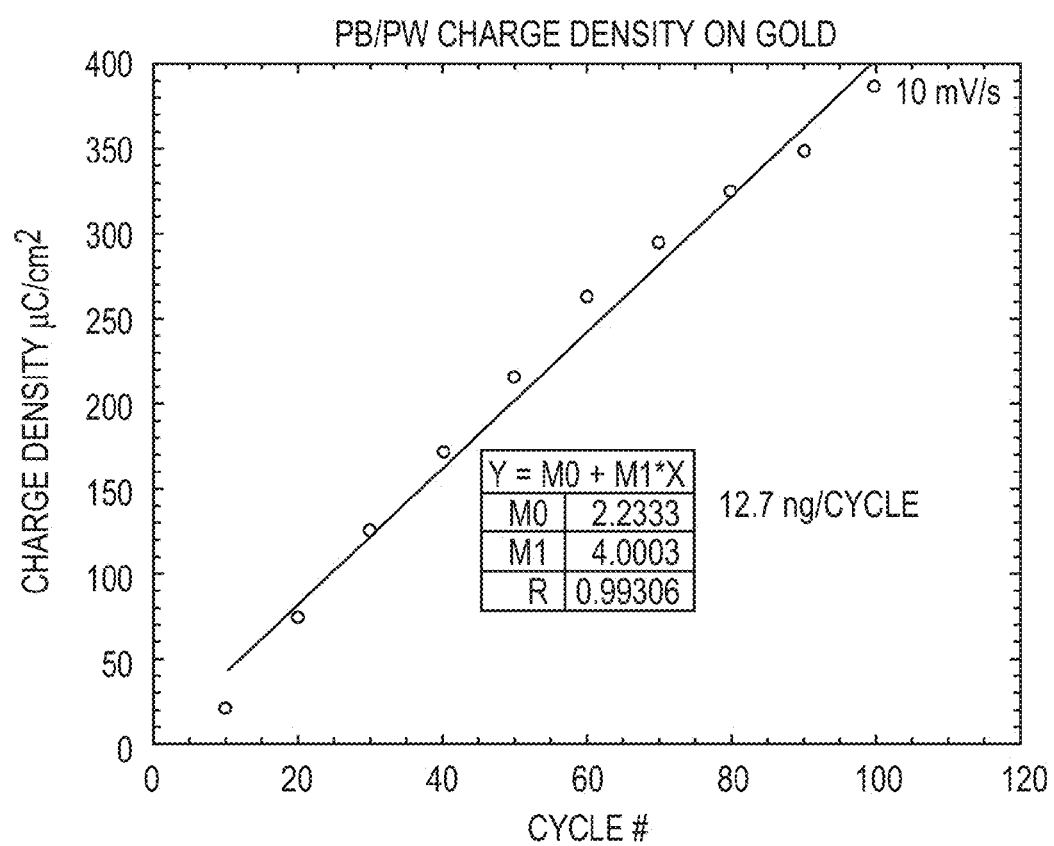
FIG. 8 is a graph of charge density versus cycle number for assessing charge density on gold.

The deposition rate can be quantified by integrating the PB/PW reduction current from voltammograms similar to those shown in FIGS. 2A-2D. Only the current associated with the sharp reduction peak at −0.4 V is integrated. Ferricyanide reduction to ferrocyanide is considered background current and is subtracted from the PB/PW current. A typical charge density versus cycle number plot is shown in FIG. 8.

The slope of a linear fit of the data yields a charge density per cycle ($Q_{PB/cyc}$) of 4.0 µC/(cm²-cycle). This can be converted to moles of PB per cycle ($N_{PB/cyc}$) using Faraday's law, as shown in equation (III):

$$N_{PB/cyc} = \frac{Q_{PB/cyc}}{nF} \quad (III)$$

where n is the number of electrons passed per mole of PB reduced and F is Faraday's constant (96500 C/mol). It is assumed that PB reduction is described by the following electrochemical reaction (previously noted equation (II)):

$$KFe^{III}Fe^{II}(CN)_6 + e^- + K^+ \leftrightarrow K_2Fe^{II}Fe^{II}(CN)_6 \quad (II)$$

which defines n as 1.0. This yields a value for $N_{PB/cyc}$ of $4 \times 10^{-11}$ mol/cm$^2$ of KFeFe(CN)$_6$ per cycle. The coverage calculation (in monolayers) assumes a cubic unit cell with 10.13 Å lattice parameter and that each unit cell contains 3KFe$^{III}$Fe$^{II}$(CN)$_6$. This yields a KFeFe(CN)$_6$ coverage of approximately 0.1 monolayer per cycle. Based on this growth rate, 200 cycles would produce a film approximately 20 nm thick, assuming uniform deposition.

The switching speed of an electrochromic light modulator is fundamentally limited by the diffusivity of combined charge (electrons and ions) through the thickness of the active electrochromic layer when exchanged with a liquid or solid state electrolyte. Device implementations to date typically rely on direct, normal incidence transmission of light through bulk, planar films of electrochromic material. Given the relatively long optical absorption lengths characteristic of bulk electrochromic materials in their absorbing state, switching contrast of sufficiently high level for practical device operation (approximately 80% for PEDOT:PSS) can only be achieved via the use of an active electrochromic layer with relatively large thickness values on the order of approximately 1 micron. Typical charge diffusivities then limit device switching times to relatively long times such as on the order of 2 seconds to 5 seconds.

The nanoslit-based electrochromic device of the present subject matter achieves a high optical switching contrast (approximately 96%) without the usual requirement of a thick electrochromic layer. Instead, the electrochromic device exploits a novel geometry in which the electrochromic material is present in the form of a collection of Prussian Blue cubic crystals of nanoscale lateral dimension (approximately 20 nm) and which are packed in a manner which is highly porous to the liquid electrolyte. As a result, the maximum distance between the electrolyte and any point of the volume of the electrochromic material does not exceed approximately 10 nm on average. A value of approximately $10^{-11}$ cm$^2$/s for the combined (electron/ion) charge diffusivity (based on the published value for bulk Prussian Blue), then implies a diffusion limited time constant of approximately 0.6 second, yielding an equivalent estimated value for the theoretical minimum switching time of the device. Measurements of the switching speed of the nanoslit-based electrochromic device, modulated with an optical contrast of approximately 96%, yield a substantially higher switching time of approximately 2 seconds. It is believed this value response to be limited however by the resistive-capacitive (RC) time constant of the electrochemical cell, which is not optimized for speed.

In another set of evaluations, two distinct plasmonic electrochromic optical switches were fabricated to implement fast switching color display pixels, one incorporating Au and one incorporating Al. The first device ("Au-PECOS", FIG. 9A) incorporates optically opaque, 250 nm thick Au film ("electrode") patterned with a slit array (nominal slit width: 50 nm) and coated with a thin layer electrochromic (EC) polymer of polyaniline. The device is immersed in an electrolyte solution (see methods section). A voltage is then applied between the Au film and a Pt counter electrode (not shown), also immersed in the solution. A voltage applied to the electrode causes electrons (from the metal) and ions (from the electrolyte) to either flow in (reduction) or out (oxidation) of the polymer, thus changing its state of charge and, therefore, its optical characteristics. In the Au-PECOS, light transmitted through the slits travels as an SPP wave with field maxima at the interface of the metallic sidewalls and the EC polymer, defining the slit depth as the effective optical thickness (which in the present case can exceed the EC active material thickness by more than a factor of one hundred). Strong optical absorption can then be obtained using a thin polymer layer, while simultaneously achieving a fast switching time due to correspondingly small charge propagation distance (normal to film surface and orthogonal to direction of light propagation) required to fully switch the EC film. This combination of efficient contrast modulation and switching speed cannot readily be achieved in a more straightforward non-plasmonic electrochromic optical switch ("Au-NECOS") device configuration (FIG. 9C) relying on direct interaction of light transmitted through a planar, un-patterned EC polymer layer, normal to the polymer surface. The device electrode in this case is provided by a semi-transparent, highly transmitting thin Au film bearing the polymer thin film (with the Pt counter electrode once again not shown in the figure). The device 5 depicted in FIG. 9C includes a substrate 1, a layer 2 of an electrically conductive material, a layer 3 of an electrochromic material, and an electrolyte 4. Achieving an effective EC optical thickness and switching contrast comparable to that of a plasmonic-enhanced device such as Au-PECOS then implies use of a thicker polymer layer, leading to correspondingly longer charge transfer distances and slower switching speeds.

Figure 9B:
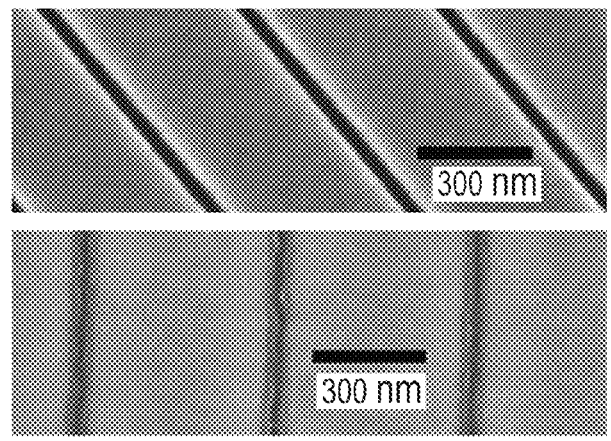
FIG. 9B is a scanning electron micrograph of a surface of the Au-PECOS device before (top) and after (bottom) deposition of polyaniline to a thickness of d=15 nm.
Figure 9C:
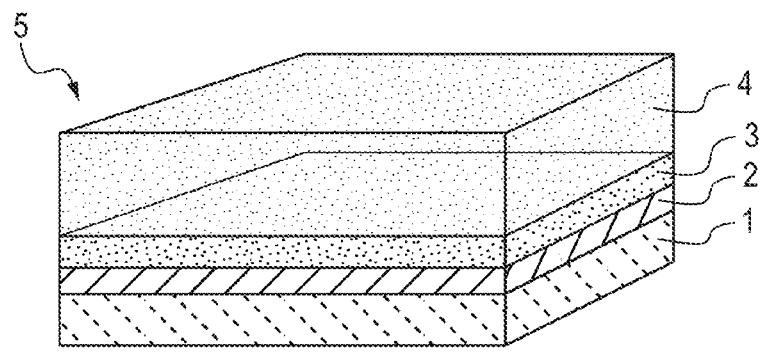
FIG. 9C is a schematic diagram of a reference non-plasmonic electrochromic optical switch ("Au-NECOS").

Patterned EC devices corresponding to the Au-PECOS geometry (FIG. 9A) were fabricated by evaporation of a 250 nm thick Au film onto a 25 mm×25 mm borosilicate glass substrate (coated with a 5 nm thick Ti adhesion layer), followed by focused ion beam (FIB) milling of a slit array (nominal slit width w=50 nm; pitch P=500 nm) over a 100 μm×100 μm area. SEM images of the resulting array, before and after deposition of polyaniline by potentiodynamic cycling to a thickness d being approximately 15 nm (where d was calculated from the total cathodic charge density), are shown in FIG. 9B. Similar Au-PECOS nanoslit arrays were coated instead with polyaniline films of thicknesses d ranging from about 1.7 nm to about 25 nm. Planar EC devices corresponding to the Au-NECOS geometry (FIG. 9C) were also fabricated by depositing polyaniline films of thicknesses similar to those of Au-PECOS on glass substrates coated with 25 nm thick Au films (on 5 nm thick Ti adhesion layers). A custom built photoelectrochemical cell was used to switch the polyaniline films between the clear leucoemeraldine state (−0.2 V vs. Ag/AgCl) and the green emeraldine state (0.3 V vs Ag/AgCl). The films were not further oxidized to the emeraldine base or the pernigraniline states to avoid polymer degradation over thousands of switching cycles. A HeNe laser (wavelength of 633 nm) was used to illuminate both Au-PECOS and Au-NECOS devices while the polymer was cycled between the clear and absorbing states. The transmitted light intensity was detected using an inverted microscope and either a CCD camera or a photodiode.

Figure 10A:
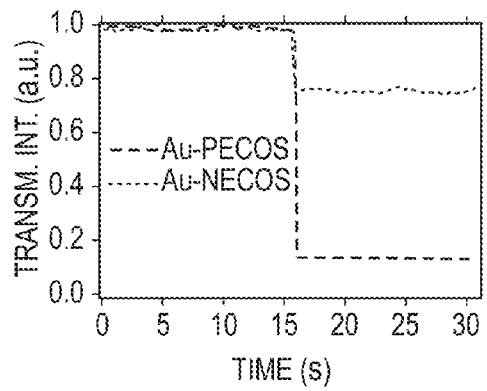
FIG. 10A is a graph of transmitted light intensity versus time for, respectively, Au-PECOS (dashed line) and reference Au-NECOS (dotted line) structures coated with an approximately 25 nm thick polyaniline layer, given step transition in applied voltage at t=15 s, from −0.2 V (clear) to 0.3 V (absorbing) state.
Figure 10B:
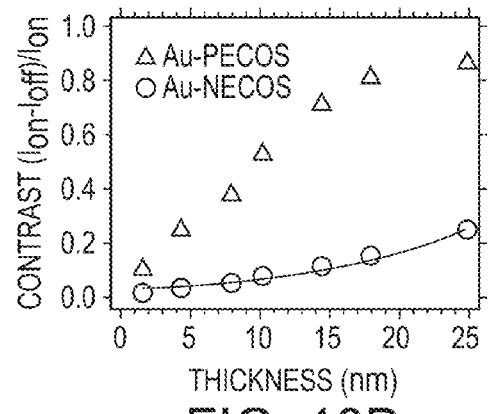
FIG. 10B is a graph of switching contrast γ versus polyaniline thickness for Au-PECOS (triangle symbols) and Au-NECOS (circle symbols) structures. The black line is an exponential fit to Au-NECOS data.
Figure 10C:
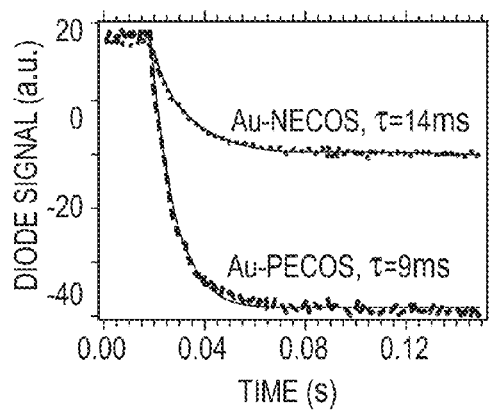
FIG. 10C is a graph of transmitted light intensity (measured using a photodiode) versus time for Au-PECOS and Au-NECOS devices, each coated with approximately 15 nm thick polyaniline films (under voltage switching conditions of FIG. 10B).
Figure 10D:
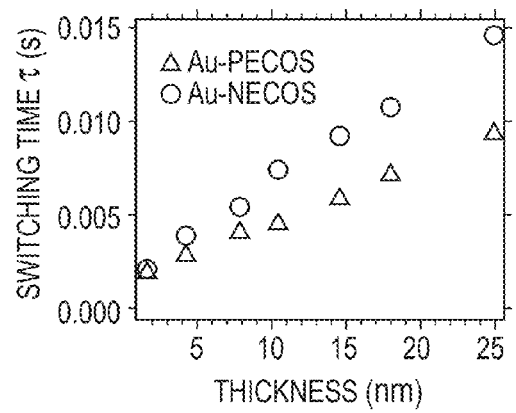
FIG. 10D is a graph of switching speed τ for each device versus polyaniline film thickness (Au-PECOS is represented by triangle symbols, Au-NECOS is represented by circle symbols).

FIG. 10A displays the transmitted light intensity I versus time t, for, respectively, Au-PECOS and reference Au-NECOS structures (both coated with a polyaniline film of thickness of approximately 25 nm), given an abrupt step transition in applied voltage from −0.2 V and 0.3 V (vs. Ag/AgCl) at time t=15 s. FIG. 10B plots the switching contrast $\gamma=(I_{ON}-I_{OFF})/I_{ON}$ versus polyaniline film thickness d for both devices, where $I_{ON}$ and $I_{OFF}$ refer to, respectively, the transmitted intensity in the clear (−0.2 V vs. Ag/AgCl) and the emeraldine (+0.3 V vs. Ag/AgCl) states. The function γ(d) for the reference Au-NECOS specimen can be well fitted with a simple exponential yielding an extinction coefficient κ of approximately 0.1. This value is similar to that measured for thin polyaniline in the emeraldine state using in-situ ellipsometry. On the other hand, the increase in absorption with film thickness for the Au-PECOS array appears linear with a noticeable roll off beyond d=15 nm. In FIG. 10C, the transmitted light intensity measured using the photodiode is plotted versus time (under voltage switching conditions of FIG. 10B) for Au-PECOS and Au-NECOS devices, each coated with approximately 15 nm thick polyaniline films. The switching speed τ for each device versus polyaniline film thickness is summarized in FIG. 10D. Finally, a Au-PECOS device coated with a 15 nm thick layer of polyaniline and illuminated at a wavelength of 633 nm was also fabricated while switching the voltage between −0.2 V and 0.3 V versus Ag/AgCl. These results illustrate that while the optical switching speeds for EC films of identical thickness on the plasmonic nanoslit array and unpatterned electrodes, respectively, have similar values, e.g. about 50 ms for a 75% change in intensity, the difference in optical contrast is considerable, e.g. about 35% for the unpatterned Au-NECOS structure, versus approximately 87% for the Au-PECOS nanoslit array. It is important to note that though the wavelength chosen for these evaluations, λ=633 nm, is far from the wavelength of maximum optical absorption for emeraldine, e.g. about 800 nm, the combination of high spatial overlap and long interaction length between SPPs and EC material in the Au-PECOS configuration results in high optical absorption even at wavelengths far from the peak absorption values for the EC polymer.

Figure 12:
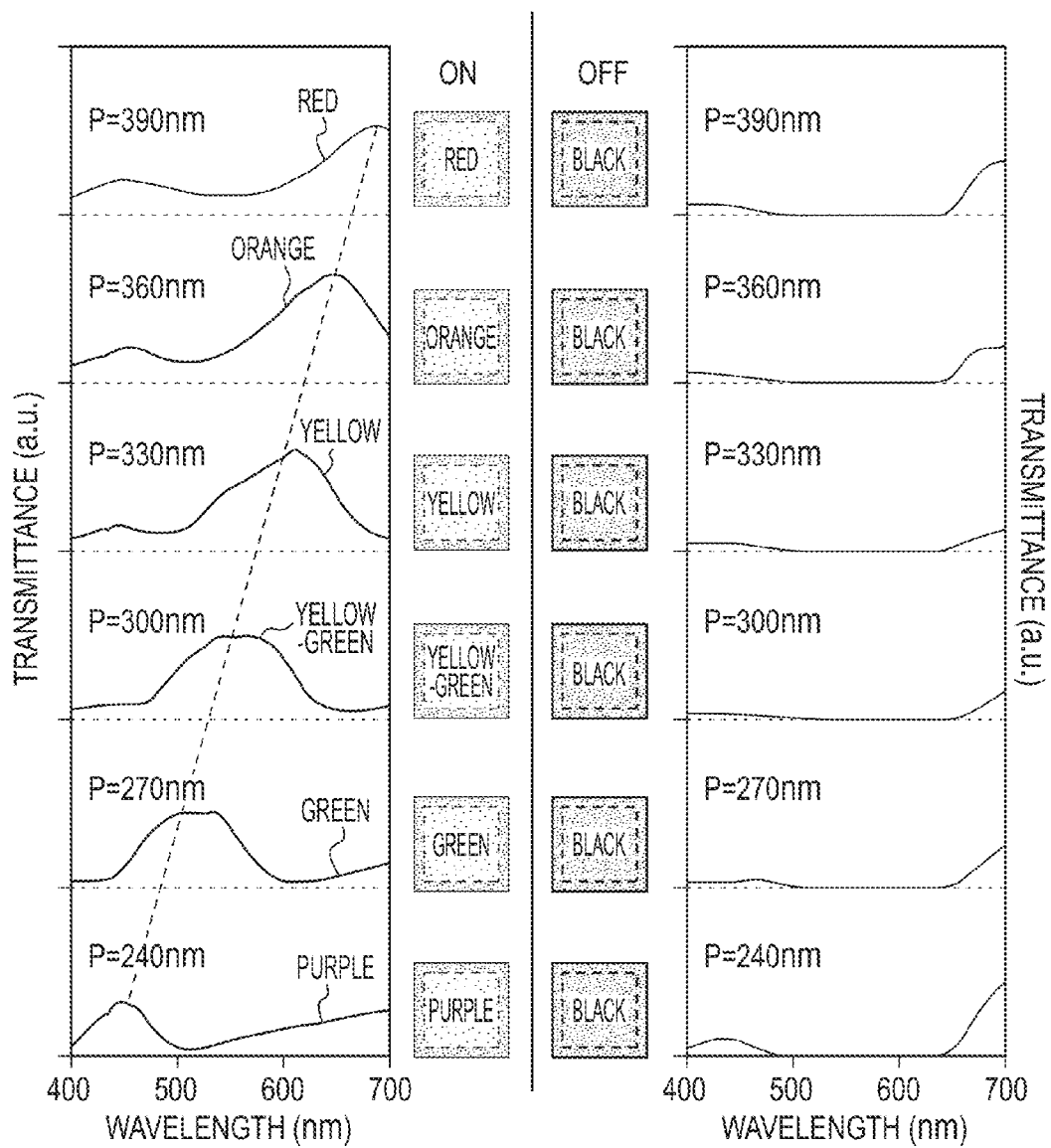
FIG. 12 is normalized optical transmission spectra of Poly (ProDOT-Me$_2$) coated Al-PECOS devices (each occupying an area of 10 μm×10 μm) with respective values (bottom to top) of slit period P=240, 270, 300, 330, 360, and 390 nm, along with corresponding optical micrographs of device areas imaged in transmission. Transmission spectra and micrographs for both "on" (left) and "off" (right) states of the polymer are displayed. The black dashed line in the left transmission spectrum panel indicates wavelength of peak transmission.

The ability to effectively absorb light over a broad spectral range implies that PECOS devices employing a single EC polymer could function as switchable color pixels, provided that color selectivity is achieved by means other than the spectral characteristics of a particular EC polymer. Plasmonic structures, including slit arrays, have been used in the past as color filters. The period of the slits controls the band of light that the array will transmit. By changing the period, one can tune the SPP enhancement to a specific band within the switchable range of the electrochromic material. In the present subject matter, PECOS color switches are provided which utilize Al, a low-cost, earth-abundant metal that supports SPPs with low optical losses in the UV and visible part of the spectrum. Because Al forms an approximately 4 nm thick native oxide layer that makes electrodeposition on Al challenging, a 5 nm thick conformal coating of platinum was deposited using atomic layer deposition, prior to electrodeposition. In this manner, a hybrid aluminum electrochromic plasmonic optical switch is provided ("Al-PECOS", FIG. 11) that combines the attractive plasmonic performance and low cost aspects of Al with the electrochemical properties of Pt. To further narrow the spectral linewidth and increase the viewing angle, a $Si_3N_4$ waveguide layer was incorporated underneath the constituent slit array. Al-PECOS devices were prepared via physical vapor deposition of a $Si_3N_4$ waveguide layer (thickness: 170 nm) on a 25 mm×25 mm borosilicate glass substrate, followed by electron beam evaporation of Al to a thickness d=250 nm. Slits of nominal width w=50 nm were then patterned through the Al to form individual fields of area 10 μm×10 μm, with respective periods P ranging from 240 nm to 390 nm in steps of 30 nm. Poly(2,2-dimethyl-3,4 propylenedioxythiophene) (Poly(ProDOT-$Me_2$)), selected as the EC polymer for these structures due to the broad optical absorption characteristics from 400 nm to 700 nm and its relatively long term stability, was finally deposited on the slit arrays, to a thickness of about 15 nm. FIG. 12 displays the normalized optical transmission spectra of the fabricated Al-PECOS devices, along with corresponding optical micrographs, for both "on" and "off" states of the polymer. The ability to prepare a fast, switchable, high-contrast, color-tunable device from one electrochromic polymer greatly expands the potential use, application, and ability of the material set.

In the various operations and methods described, details are as follows.

Gold film and slit preparation. Gold, titanium, and aluminum films were prepared by electron beam evaporation onto pre-cleaned ultra-flat glass. Subwavelength slits were prepared by focused ion beam (FIB) milling using a dual-beam (FIB/SEM) system ($Ga^+$ ions, 30 keV beam energy).

Synthesis of polymer. Polyaniline was synthesized electrochemically from a 2 M $HNO_3$ solution containing 15 mM aniline. Cyclic votammetry was employed to deposit the films at 30 mV/s from −0.2 V to 1.05 V vs. Ag/AgCl. The thickness of the film was controlled by varying the number of cycles. PolyProDOT-$Me_2$ was synthesized with chronoamperometry at 1.3 V versus Ag wire from a ProDOT-$Me_2$ solution in acetonitrile with 0.1 M TBAP as an electrolyte.

Characterization of polymer electrodes. Polyaniline coated gold electrodes were characterized with AFM and SEM to confirm film thicknesses and the filling of the slit arrays. Cyclic voltammetry in a switching solution of 0.1 M $HNO_3$ and 1 M $NaNO_3$ confirmed the electrochemical properties of the polyaniline films. PolyProDOT-Me2 was switched in a 0.1 M $LiClO_4$ solution in a mixture (2:1) of dimethyl carbonate and ethylene carbonate.

Spectroelectrochemical measurements. Polymer coated electrodes were isolated in a custom built spectroelectrochemical cell. Pt coated glass served as the counter electrode and a micro Ag/AgCl electrode was used as a reference. All measurements were taken with the same electrolyte solution and in the same cell geometry. Samples were irradiated with a HeNe laser at 633 nm in a microscope. The transmitted light was collected with an amplified photodiode or a spectrometer.

In certain aspects of the present subject matter, a plasmonic structure in the form of an electrochromic optical switch is provided comprising nanocrystals of Prussian Blue dye electrochemically deposited in a nanoslit plasmonic waveguide, and electrochemically switched between absorptive and transmissive states. High switching contrast, evidenced here by measurements at $\lambda_0$=633 nm, is enabled via strong spatial interaction between light and active material under the respective form of SPPs propagating along the surface of the slit sidewalls and a thin layer of Prussian Blue nanocrystals located on the same surfaces. Device switching contrast is further enhanced by the anomalously large intrinsic absorption coefficient found to characterize Prussian Blue nanocrystals grown on an Au surface. As a result, the switch is able to operate efficiently under conditions of a relatively low fill fraction of active material in the slit (approximately 25%), leading to large contact area with the electrolyte. The resulting orthogonalization between the directions of light propagation, parallel to the depth of the slit, and that of charge transport from the electrolyte to ultra-thin active material, largely parallel to the width of the slit, offers significant promise for the realization of electrochromic devices with significantly reduced switching speeds.

An integrated plasmonic electrochromic optical switch (PECOS) consisting of a few monolayers of Prussian blue EC dye deposited inside a subwavelength slit in a Au film, which achieved near 100% optical switching contrast has been demonstrated. The thinness of the EC layer, about 20 nm, implies that very fast switching speeds can be achieved in this novel device configuration. Optical transmission through slit apertures of deep-subwavelength width dimensions involves the transport of optical intensity by surface plasmon polaritons (SPPs), travelling electromagnetic waves bound at metal-dielectric interfaces and sustained by surface-charge density oscillations. The near 100% switching contrast realized in the single slit PECOS was the result of high spatial overlap and long interaction length between the SPPs and the active material located on the slit sidewall. In addition, arrays of plasmonic nanoslits, i.e. slits of deep subwavelength width in an opaque metal film such as Au, Ag, or Al, can function as color filters, making it possible to tune the frequency band modulated by the EC transition. Tuning the pitch of the plasmonic grating to have maximum transmission at a target wavelength within the switchable range of the EC material enhances transmission for that specific wavelength and suppresses the others via first order interference of SPPs. Coupled with the speed and contrast enhancement from the nanoslit geometry, this color selectivity greatly improves the viability of EC materials for display applications as a video rate, single layer, single material device can be produced. Inherent in the application is the ability to tune the color balance or white balance of the display by combining different numbers of pitches responsible for the different color bands.

In still other aspects of the present subject matter, subwavelength plasmonic nanopores, apertures and slit arrays provide fertile ground for enhancing optically sensitive materials as well as detecting small amounts of material. The plasmonic substrate enhances the optical performance of the conformal coating of electrochromic material, yielding a device with the charge transfer properties of a thin film and the optical properties of a thick film, while also permitting electrical control over the SPP wavelength and intensity. Hybrid electrodes enable the use of a bi-metallic system: platinum for chemistry and attachment, and aluminum for cost and plasmon-enhancement into the ultraviolet. Tuning the periodic structure of the subwavelenth arrays controls the properties of the light interacting with the material deposited on the electrode and provides control over the SPP-based enhancement. Combining all of these concepts, devices can be fabricated from the single light blue to dark blue electrochromic transition of Poly(ProDOT-Me$_2$) that is tunable across the visible spectrum. The speed and contrast enhancement resulting from the SPP interaction with the conformal coating of electrochromic material provide a pathway to a single-layer, full color, high contrast, bi-stable, low power display with video-rate capabilities. Further, by selecting the proper electrochromic material for the application one can prepare a high speed shutter or switch to electronically control the properties of SPPs in an optical device. Larger area devices can be fabricated with nanoimprint lithography. The enhancement observed for the conformal coating of electrochromic material can be translated to any optically sensitive material with thickness-dependent properties, such as charge diffusion length, with applications ranging from catalysis to photovoltaics.

In the case of electrochromics, the present subject matter would allow electrochromic devices to have significantly higher contrast and faster switching speeds while using less electrochromic material and switching power. Additionally a multi-color single layer display can be driven with the same voltages for each color.

Although the present subject matter has been primarily described with regard to plasmonic/electrochromic switches or structures operating in transmission, it will be understood that the present subject matter includes the use of the structures and/or devices operating in other modes such as for example reflection mode. Specifically for example, the present subject matter includes displays utilizing the plasmonic/electrochromic switches or structures operating in reflective mode. That is, the switches or structures could be visible as a result of background or ambient light and therefore an active backlight would not be required.

In certain applications, the one or more nanoslits may not extend entirely through the thickness of the film or electrically conductive material as generally described herein. That is, in certain versions of the present subject matter, the nanoslit(s) may extend only partially through the thickness of the film. For example, the nanoslits may extend about 10%, about 20%, about 30%, about 40%, about 50%, about 60%, about 70%, about 80%, about 90%, or less than or more than these percentages (percentages are based upon the total thickness of the film or electrically conductive material). For certain reflection mode devices, the nanoslits need not extend entirely through the thickness of the film. The depth of the nonoslits can be tuned to optimize device performance. For example, the nanoslits depth can be tailored to obtain desired spectral characteristics for the device when operating in reflection mode.

The present subject matter is not restricted to electrochromic materials, as it can be applied to any optically active medium. The main benefits stemming from the decoupling of the light path from the current and ionic diffusion paths include; less material (thinner film) required to have the same physical properties as a thicker flat film, and less power for the same or improved performance (higher contrast, faster response). The spatial properties of the nanostructured electrodes and SPP generation enable one to control the wavelength of light transmitted. This electrode geometry can be extended to any material which has optical sensitivity and/or thickness-dependent properties.

Additional description of plasmonic structures, their formation, and operation are provided in Cai W., White J. S., and Brongersma M. L.; "Compact, High-Speed and Power-Efficient Electrooptic Plasmonic Modulators"; Nano Letters, Vol. 9, No. 12, 2009; and Haraguchi M., Iuchi K., Sokabe H., Okuno T., Okamoto T., Fukui M., Okamoto K., and Tagawa S., "Gap Plasmon Waveguide With a Stub: Structure for a Wavelength Selective Device," Plasmonics, Nanoimaging, Nanofabrication, and their Applications V, Proc. Of SPIE Vol. 7395, 2009.

The present subject matter will find potential application in reflective and transmissive displays and sensors, active waveguiding, SPP control, plasmonic enhancement and catalyst materials and solar cells.

Many other benefits will no doubt become apparent from future application and development of this technology.

All patents, applications, and articles noted herein are hereby incorporated by reference in their entirety.

As described hereinabove, the present subject matter overcomes many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A plasmonic structure comprising:
   a substrate;
   an electrically conductive film disposed on the substrate, the film defining an outer face, the film also defining at least one nanoslit extending through at least a portion of the thickness of the film, the nanoslit defining opposing sidewalls; and
   an effective amount of an electrochromic material disposed on the sidewalls of the nanoslit.

2. The plasmonic structure of claim 1 wherein the at least one nanoslit extends though the entirety of the thickness of the film.

3. The plasmonic structure of claim 1 wherein the substrate is selected from the group consisting of fused silica, fused quartz, and glass.

4. The plasmonic structure of claim 1 wherein the electrically conductive film is selected from the group consisting of gold, silver, aluminum, indium tin oxide, and combinations thereof.

5. The plasmonic structure of claim 1 wherein the electrically conductive film is from about 50 nm to about 500 nm in thickness.

6. The plasmonic structure of claim 1 wherein the nanoslit has a width of from about 10 nm to about 100 nm.

7. The plasmonic structure of claim 6 wherein the nanoslit has a width of about 50 nm.

8. The plasmonic structure of claim 1 wherein the electrochromic material is in the form of a layer of nanoparticles having a thickness of from about 1 nm to about 100 nm.

9. The plasmonic structure of claim 8 wherein the layer of nanoparticles of electrochromic material is an electrochromic polymer.

10. The plasmonic structure of claim 1 wherein the effective amount of the electrochromic material is such that a fill fraction of the electrochromic material in the nanoslit is from about 10% to about 30%.

11. The plasmonic structure of claim 10 wherein the fill fraction is about 25%.

12. The plasmonic structure of claim 1 wherein the plasmonic structure is in the form of an optical switch and exhibits an optical switching contrast of at least 70%.

13. The plasmonic structure of claim 12 wherein the switch exhibits an optical switching contrast of at least 80%.

14. The plasmonic structure of claim 13 wherein the switch exhibits an optical switching contrast of at least 90%.

15. An electrochromic device comprising:
    a fluid medium in the form of an electrolyte;
    a plurality of plasmonic structures, each plasmonic structure including (i) a substrate, (ii) an electrically conductive film disposed on the substrate, the film defining an outer face and at least one nanoslit extending through at least a portion of the thickness of the film, the nanoslit defining opposing sidewalls, and (iii) an effective amount of an electrochromic material disposed on the sidewalls of the nanoslit;
    wherein each of the plurality of plasmonic structures are is exposed to, and in contact with, the fluid medium along the outer face and within the nanoslit of the plasmonic structure.

16. The electrochromic device of claim 15 wherein the at least one nanoslit extends through the entirety of the thickness of the film.

17. The electrochromic device of claim 15 wherein the nanoslit has a width of from about 10 nm to about 100 nm.

18. The electrochromic device of claim 15 wherein the electrochromic material is in the form of a layer of nanocrystals disposed on the sidewalls of the nanoslit and having a thickness of from about 1 nm to about 100 nm.

19. The electrochromic device of claim 15 wherein the effective amount of the electrochromic material is such that a fill fraction of the electrochromic material in the nanoslit is from about 10% to about 30%.

20. A plasmonic electrochromic optical switch comprising:
    a substrate;
    a layer of an electrically conductive material disposed on the substrate, the layer of electrically conductive material defining a top face, the layer of electrically conductive material selected from the group consisting of gold, silver, aluminum, indium tin oxide, and combinations thereof;
    at least one nanoslit defined in the layer of electrically conductive material, the nanoslit extending through at least a portion of the thickness of the electrically conductive material, the nanoslit defining opposing sidewalls;
    a layer of an electrochromic polymer disposed on the top face of the electrically conductive material and on the nanoslit sidewalls; and
    an electrolyte in contact with the layer of the electrochromic polymer and disposed between the opposing sidewalls of the nanoslit.

21. The plasmonic electrochromic optical switch of claim 20 wherein the nanoslit has a width of from about 10 nm to about 100 nm and the thickness of the layer of the electrochromic polymer is from about 1 nm to about 100 nm.

22. The plasmonic electrochromic optical switch of claim 20 wherein the nanoslit extends through the entirety of the thickness of the electrically conductive material.

23. A method of improving performance of a plasmonic device utilizing an electrically conductive film disposed on a substrate, the film defining at least one nanoslit extending through at least a portion of the thickness of the film, the nanoslit defining opposing sidewalls, the method comprising:
    incorporating an effective amount of an electrochromic material in the plasmonic device, whereby incorporating the electrochromic material is performed by depositing an effective amount of the electrochromic material on the sidewalls of the nanoslit.

\* \* \* \* \*

UNITED STATES PATENT AND TRADEMARK OFFICE
CERTIFICATE OF CORRECTION

| | | |
|---|---|---|
| PATENT NO. | : 9,046,731 B2 | Page 1 of 1 |
| APPLICATION NO. | : 13/756605 | |
| DATED | : June 2, 2015 | |
| INVENTOR(S) | : Lezec et al. | |

It is certified that error appears in the above-identified patent and that said Letters Patent is hereby corrected as shown below:

On the title page of US 9,046,731 identify the Assignees as (i) National Institute of Standards and Technology, and (ii) University of Maryland, College Park.

Signed and Sealed this
Twenty-seventh Day of October, 2015

Michelle K. Lee
*Director of the United States Patent and Trademark Office*

UNITED STATES PATENT AND TRADEMARK OFFICE
CERTIFICATE OF CORRECTION

PATENT NO. : 9,046,731 B2  
APPLICATION NO. : 13/756605  
DATED : June 2, 2015  
INVENTOR(S) : Lezec et al.

Page 1 of 1

It is certified that error appears in the above-identified patent and that said Letters Patent is hereby corrected as shown below:

On the title page item (73) the Assignees should read as (i) National Institute of Standards and Technology, and (ii) University of Maryland, College Park.

This certificate supersedes the Certificate of Correction issued October 6, 2015.

Signed and Sealed this  
Fifth Day of January, 2016

Michelle K. Lee  
*Director of the United States Patent and Trademark Office*